United States Patent [19]
Niegel et al.

[11] Patent Number: 5,280,502
[45] Date of Patent: Jan. 18, 1994

[54] CIRCUIT ARRANGEMENT FOR REMOVING STUFF BITS

[75] Inventors: Michael Niegel, Nürnberg; Ralph Urbansky, Schwaig; Miguel Robledo, Nürnberg, all of Fed. Rep. of Germany

[73] Assignee: U.S. Philips Corporation, New York, N.Y.

[21] Appl. No.: 782,710

[22] Filed: Oct. 25, 1991

[30] Foreign Application Priority Data

Nov. 8, 1990 [DE] Fed. Rep. of Germany ....... 4035438

[51] Int. Cl.[5] .............................................. H04L 7/00
[52] U.S. Cl. ..................................... 375/112; 370/102
[58] Field of Search ....................... 375/112, 117, 118; 370/102, 84, 99, 108, 101, 105.1; 341/61, 95

[56] References Cited

U.S. PATENT DOCUMENTS

| | | | |
|---|---|---|---|
| 4,596,026 | 6/1986 | Cease et al. | 370/102 |
| 4,899,339 | 2/1990 | Shibagaki et al. | |
| 5,030,951 | 7/1991 | Eda et al. | 375/112 |
| 5,091,907 | 2/1992 | Wettengel | 370/99 |
| 5,132,970 | 6/1992 | Urbansky | 375/112 |

FOREIGN PATENT DOCUMENTS 0374436 10/1989 European Pat. Off. .

Primary Examiner—Curtis Kuntz
Assistant Examiner—Don N. Vo
Attorney, Agent, or Firm—Anne E. Barschall

[57] ABSTRACT

The described circuit arrangement for removing stuff bits from a frame-structured signal which is available in n parallel bits, comprises a memory circuit (2) which is supplied with the parallel bits (1b). The memory circuit (2) is followed by a controllable selection circuit (3) having n outputs (3a). A control circuit (9) produces control signals (9b, 9c), which determine which bits stored in the memory circuit are transported to the n outputs (3a) of the selection circuit (3). The memory circuit (2) comprises only n delay elements by which each of the n parallel bits (1b) is delayed for the duration of one bit. So as to provide that n delay elements will be sufficient, the control circuit (9) is to block at predetermined time intervals the acceptance of new bits in one or a plurality of delay elements.

2 Claims, 4 Drawing Sheets

|   | T-Nr. | 0 | 1 | 2 |
|---|---|---|---|---|
| A | 1,2,19,20,21,30,51,52 | A | B | B |
| B | 3,22,31,53 | - | C | Q |
| C | 4,32 | D | D | D |
| D | 5,6,33,41 | D | E | T |
| E | 7 | F | F | F |
| F | 8,24,25,55 | F | F | R |
| G | 9,56 | H | H | H |
| H | 10,44,45,57 | H | I | U |
| I | 11 | J | J | J |
| J | 12,27 | J | K | S |
| K | 13 | L | L | L |
| L | 14,37 | L | M | V |
| M | 15,49 | N | N | N |
| N | 16,29,50 | N | O | A |
| O | 17 | P | P | W |
| P | 18 | P | A | - |
| Q | 23,54 | F | F | F |
| R | 26 | J | J | J |
| S | 28 | N | N | N |
| T | 34,42 | H | H | H |
| U | 36,46,58 | L | L | L |
| V | 38 | P | P | W |
| W | 39 | - | X | - |
| X | 40 | D | D | D |

FIG.3

CIRCUIT ARRANGEMENT FOR REMOVING STUFF BITS

BACKGROUND OF THE INVENTION

1. Field of the Invention

The invention relates to a circuit arrangement for removing stuff bits from a frame-structured signal, which is available in n parallel bits, comprising
a) a memory circuit for storing the bits supplied in parallel,
b) a controllable selection circuit having n outputs and coupled to the output of the memory circuit in the arrangement, and
c) a control circuit having a control signal for determining the switching state of the selection circuit, and in that this switching state determines which of the bits stored in the memory circuit are applied to the n outputs of the selection circuit.

2. Related Art

Such a circuit arrangement is known from EP-A2-0 374 436. It is used, for example, in information transmission systems in which what is commonly referred to as stuff bits are inserted into the data signal having the lower clock rate to adapt the bit rates of two data signals which have different clock rates. These stuff bits do not represent any actual information and are again removed by an arrangement having the above characteristic features after the data have been transmitted. The stuff bits are situated at defined locations in the data signal. Most of these stuff bits have fixed positions and are necessary for a coarse frequency adjustment. A so-called variable stuff bit which is inserted into the data at irregular positions is used for fine frequency adjustment. The information whether a variable stuff bit is transmitted is also transmitted in the data signal as stuff information at a defined position. In the receiver the original data rate is recovered by removing all stuff bits and all further auxiliary information signals.

If stuff bits are to be removed from a serial data signal having a bit rate of the order of 140 Mbit/s, the complete circuit arrangement is to be structured in high-dissipative ECL technology. In order to reduce the dissipation, the serial data signal is converted into n parallel bit streams in a serial-to-parallel converter. If n is sufficiently large, the data streams can be processed in low-power CMOS technology after the conversion.

After the conversion of the serial data signal into n parallel bit streams there is the problem of extracting the stuff bits from the bit streams. For this purpose a memory circuit and a subsequent controllable selection circuit having n outputs is used according to EP-A2-0 374 436. The memory circuit of EP-A2-0 374 436 comprises at least 2n−1 memory cells. The control circuit which is used for adjusting the switching condition of the selection circuit is not described in detail. However, it is connected to the selection circuit over at least 2n−1 control lines so that an unrecognizable conversion of the stuff information signals into the control signals for the selection circuit is to take place in the control circuit.

SUMMARY OF THE INVENTION

It is an object of the invention to provide a circuit arrangement of the type mentioned in the preamble in which the memory circuit comprises fewer memory cells. An additional object consists of structuring the selection circuit in such a way that it can be controlled by means of a comparatively simple control circuit.

This object is achieved in that the following characteristic features are implemented:
d) the memory circuit comprises n delay elements for delaying each of the n parallel bits by the duration of one bit,
e) if a maximum of p (p smaller than or equal to n) stuff bits can simultaneously occur among the n parallel bits, at predetermined intervals the control circuit will block the acceptance of new bits in p-1 delay elements out of the n delay elements.

In continuation thereof the additional object is achieved in that the following characteristic features are implemented:
f) the selection circuit comprises cascades of addressable multiplexers,
g) the control circuit comprises a modulo-n counting stuff bit counter whose count can be adjusted by means of a negative justification signal,
h) the count of the stuff bit counter as well as the negative justification signal form addresses for the multiplexers, and
i) the address inputs of the multiplexers of a cascade are arranged in parallel.

BRIEF DESCRIPTION OF THE DRAWING

The invention will be further explained with the aid of an exemplary embodiment and with reference to the drawing Figures, in which:

FIG. 3 shows a state diagram, and

DETAILED DESCRIPTION OF THE PREFERRED EMBODIMENTS

Figure 1:
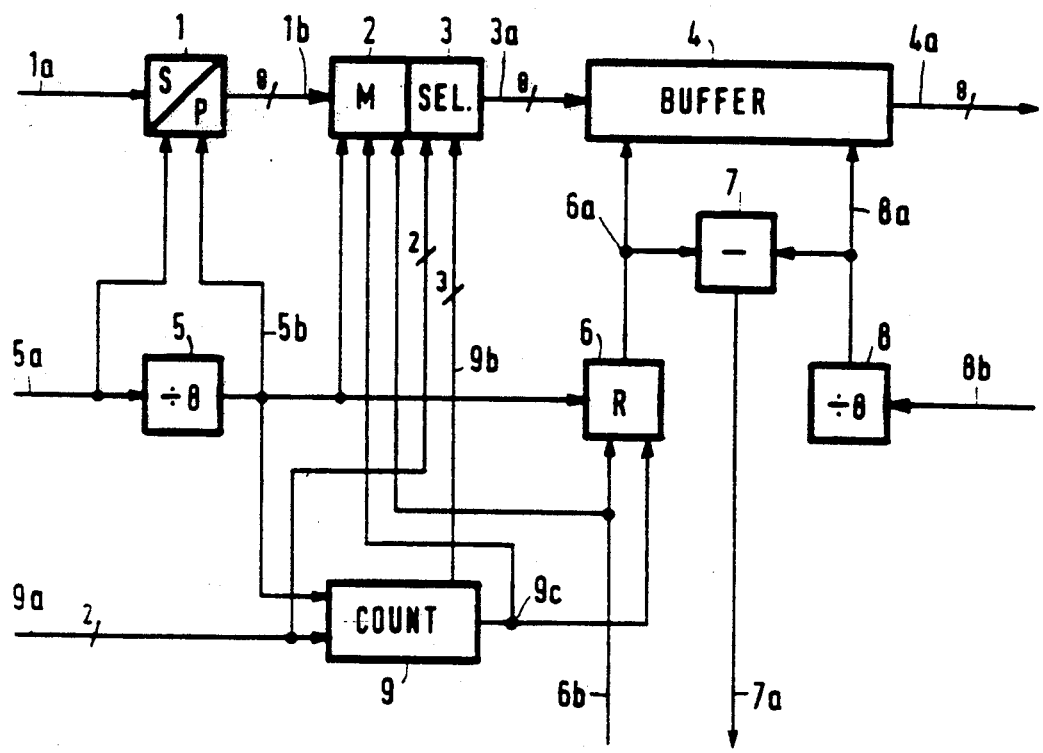
FIG. 1 shows a basic circuit diagram according to the invention with its technical environment.

In FIG. 1 a synchronous transport module STM-1 structured signal is transported to a serial-to-parallel converter 1 over a line 1a at a bit rate of 155.52 Mbit/s (cf. for this purpose CCITT Recommendations G 707, G 708 and G 709). In the following, identical reference numerals will be used for a line, for the signals transmitted over this line and for the terminals connected to this line.

The signal 1a is supplied by a demultiplexer (not shown) which partitions a synchronous transport module STM-4 into four transport modules STM-1. It also supplies the associated bit clock over a line 5a. The bit clock is reduced by a divider 5 at the ratio of 1:8. The reduced clock 5b (to be called byte clock hereinafter) is applied to the serial-to-parallel converter 1, a stuff bit counter 9, a write counter 6 and a memory circuit 2. The eight inputs of the memory circuit 2 are connected to the eight outputs of the serial-to-parallel converter 1 via an eight-wire line 1b. The serial data signal 1a is thus partitioned into eight (n=8) parallel bit streams. In addition to the byte clock 5b the memory circuit 2 receives the overflow pulses 9c of the stuff bit counter 9 and pulses 6b which are produced by a frame counter (not shown).

A negative justification signal is transmitted to the stuff bit counter 9 over a two-wire line 9a by a decoder (not shown) and the frame counter (not shown either). The negative justification signal 9a comprises a first signal which does not change value (stuff information) for the duration of a frame row (cf. the above-defined CCITT Recommendations). If two bits have been stuffed at a particular location of the frame row, and if also two bits are to be removed, the first signal will assume the binary one value; if not more than one bit has been stuffed, it will assume the binary zero value. The second signal on the line 9a denotes, by means of a pulse having a length of one period of the byte clock 5a, at which position(s) of the frame row one (or two) bits have been stuffed. By means of the negative justification signal 9a the receiver thus learns which byte of a frame row contains no, one or two stuff bits. The two signals and the byte clock 5b are combined by means of gates (not shown) and transported to the counter stages of the stuff bit counter 9 so that, when an edge of the byte clock 5b occurs, its count is incremented by two when two bits have been stuffed in a byte; incremented by one when only one bit has been stuffed; and is not incremented at all when no bit has been stuffed. Other possibilities in a byte are not provided in a synchronous transport module STM-1.

The memory circuit 2 is followed by a selection circuit 3. It is controlled by the negative justification signal 9a and the count of the modulo-8 stuff bit counter 9. The pulses 6b stop the write counter 6 which produces the write addresses 6a for a buffer 4 and inhibit the delay elements of the memory circuit 2 from accepting new data (further details below), so as to prevent predetermined bytes (stuff bytes or frame bytes) from being written in the buffer 4. The write counter 6 is also stopped by means of the overflow pulse 9c of the counter 9. Eight selected bits out of 16 bits of the signal 1b are transmitted via the memory circuit 2 and the selection circuit 3 wires to the buffer 4. A read clock 8b and a read counter 8 produce the read addresses 8a by which 8 parallel bits 4a are read from the buffer 4. The write addresses 6a and the read addresses 8a are subtracted from each other by means of a subtractor 7. The difference 7a is applied to a control circuit (not shown).

The signals 1a, 5a and 9a are synchronized by the demultiplexer (not shown). Consequently, the serial-to-parallel converter 1 partitions the STM-1 signal into the bytes (or rather 8-bit codewords) which constitute the signal. Always the same bit of a byte (8-bit codeword) is therefore transmitted over a specific wire of the line 1b.

Figure 2:
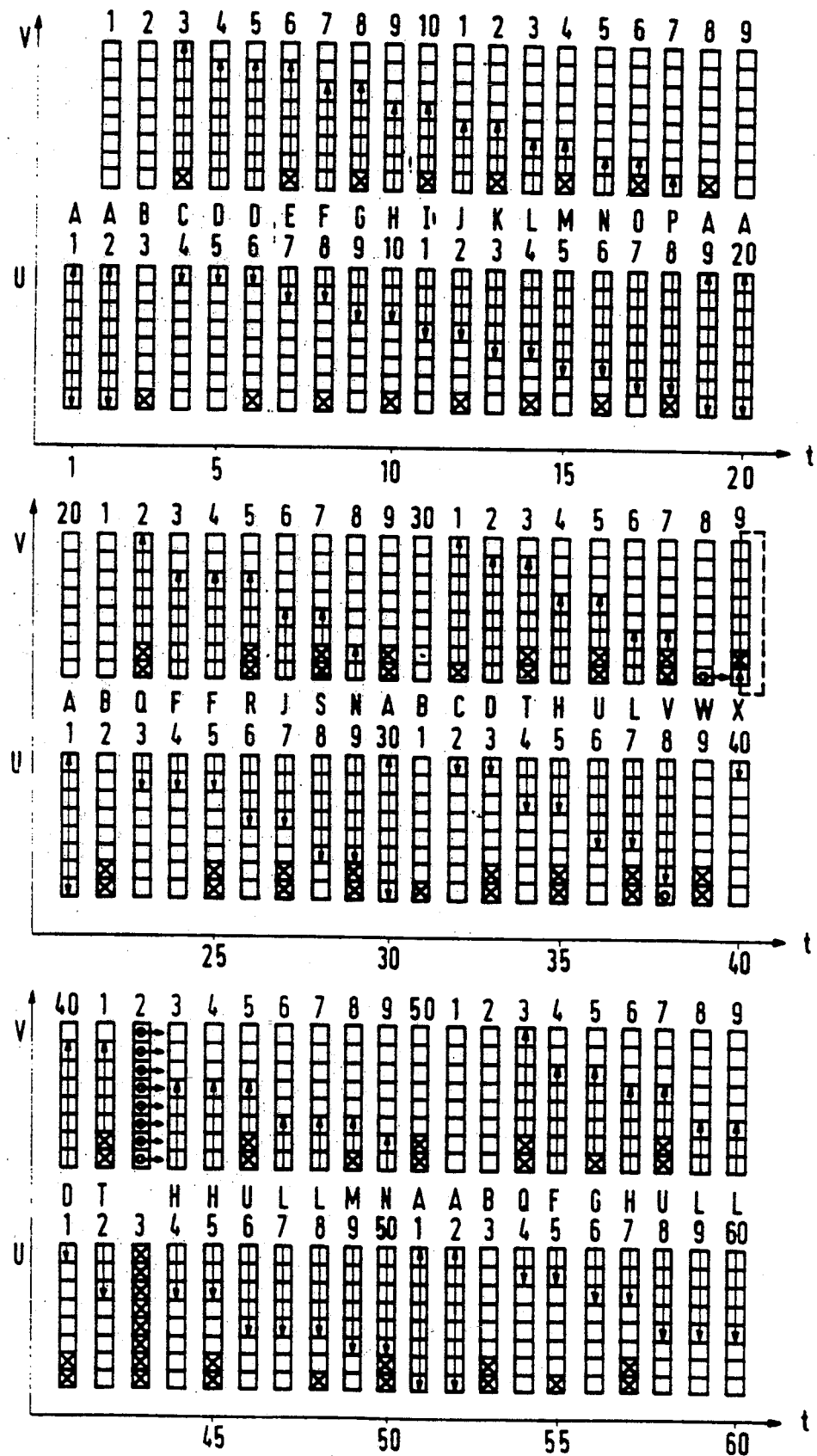
FIG. 2 shows a time diagram in explanation of the operation of a memory circuit according to the invention.

FIG. 2 shows three successive sections of a time diagram with the aid of which the combination of the memory circuit 2 according to the invention with any random-structure selection circuit and random-structure control circuit (cf. EP-A2-0 374 346) will be explained. The time t is plotted as the abscissa. On the abscissa, starting with 1, clock instants of the byte clock 5b are marked consecutively. At each of these instants the serial-to-parallel converter 1 produces eight parallel bits over the eight-wire line 1b. These bits are also numbered consecutively and in the bottom row U represented as a rectangle comprising eight squares. The bits of the bytes (8-bit codewords) have a stipulated order. According to this stipulation the first bit of a byte corresponds to the top square, the second bit to the top-but-one square and so on and so forth up to the eight bit which corresponds to the bottom square.

The same byte sequence is shown once again over the bottom row of bytes U but shifted by one time period of the byte clock 5b to the right. The top row V corresponds to the bits of a byte which are delayed by a byte clock period. The memory circuit 2 has a total of 16 outputs. At eight outputs a byte of the bottom row U of FIG. 2 is available for the duration of one byte clock period 5b and at the remaining eight outputs the byte of the top row V shown above it is simultaneously available. These outputs (further details below) are connected to as many inputs of the selection circuit 3.

The crossed squares in one byte shown in FIG. 2 denote the stuff bits. Due to the above-mentioned order of the bits and due to above-mentioned CCITT Recommendations the stuff bits occur only at the eighth position or seventh and eighth positions of a byte. Thus a maximum of two stuff bits may be found in one byte. In the present context only cases are considered where the maximum number p of stuff bits occurring in one byte is eight (generally: p smaller than or equal to n). Furthermore, it is assumed-this assumption is satisfied for STM-1 signals-that at most one of two successive bytes contains stuff bits. If a byte comprises only stuff bits, it is a matter of a stuff byte whose removal is also possible without the memory circuit 2 and the selection circuit 3. circuit 3.

The non-crossed bits, thus the useful bits in FIG. 2, are again to be arranged and written in the buffer 4 byte-by-byte. This is to say, the original time-division order (sequence) of the useful bits is to be transformed into a space-division order. The useful bit originally produced first is to be transmitted to the buffer 4 over a first wire, the next useful bit over a second wire and so on and so forth up to the eighth useful bit which is transmitted to the buffer 4 over an eighth wire. The ninth useful bit is then again transmitted over the first wire etc. This operation is denoted by means of double arrows in FIG. 2. Each of these double arrows covers eight useful bits. The useful bit having front position in the time-division sequence is the bit in which the point of the arrow points up and the last (eighth) useful bit the bit in which the point of the arrow points down. On examining the represented double arrows in FIG. 2 from the point leading up to the point leading down, the time-division sequence of useful bits will show as the sequence in which they are overwritten. In this order they are also to be fed to the first to eighth wires of line 3a.

The selection circuit 3 can now be adjusted with the aid of the control circuit 9 in each byte clock period so that the useful bits covered by a double arrow are transmitted to the buffer 4 over the appropriate lines.

In FIG. 2 they are the eight bits of the byte No. 1 which are to be transmitted over the wires one to eight of the line 3a during the first clock period. The same holds for byte No. 2. The third byte produced by serial-to-parallel converter 1 (8-bit codeword) contains a stuff bit at the eighth position. Because the second byte has already been written in the buffer 4 during the second byte clock period, only the useful bits of the third byte would be considered during the third byte clock period. However, since there are only seven, no useful bit at all is written in the buffer 4 during the third byte clock period. Consequently, no double arrow is shown in this byte clock period either. The control circuit is thus to supply a signal (to the write counter 6 according to FIG. 1) which prevents bits from being written in the buffer 4 during the third byte clock period.

The seven useful bits of the third byte are written in the buffer 4 during the fourth byte clock period together with the first useful bit of the fourth byte, as represented by the double arrow. The next operations up to byte clock 21 need little further explanation because they are self-evident from the above observations. A similar situation to the third byte clock period occurs in the 22nd byte clock period. The difference is that the 22nd byte contains two stuff bits which can be appreciated from the crosses shown in FIG. 2.

There is a peculiarity towards the 38th clock period. From the 38th byte all bits, except for the last crossed bit, have been written in the buffer. The request made in the 39th clock period to transmit this bits together with further useful bits of the byte No. 39 would be frustrated because byte No. 39 contains only six useful bits and thus only seven useful bits to be written would be obtained. Consequently, in the 39th clock period no bit at all is transmitted to the buffer 4, but the 40th clock period is waited for. In order not to lose the crossed bit of the 38th byte, the control circuit 9 is to provide that the associated memory location is not overwritten with a new bit thus with the stuff bit of the 39th byte. This is denoted in clock signal 39 by means of a circle with an arrow. In order to adhere to the prescribed order, the memory location provided for the eighth bit of the byte No. 38 is to be connected to the first wire of the line 3a in the 40th clock period. The first bit of the byte No. 39 is to be transmitted over the second wire etc. up to the first bit of the byte No. 40 which is to be transmitted over the eighth wire.

A further particularity which is discussed here only for completeness' sake, occurs in the 43rd clock period. With the 43rd byte it is a matter of a stuff byte which must not be written in either the memory cells of the memory circuit 2 or in the buffer 4. The entry is prevented by the pulses 6b which are not produced by the control circuit.

The number of times eight useful bits are covered by a double arrow as shown in FIG. 2 indicates the number of switch states the selection circuit 3 is to adopt under the influence of the control circuit 9 in case the selection circuit—as in EP-A2-0 374 436—comprises switches.

For an STM-1 signal the control circuit is to produce a total of 24 different control signals. Among them are signals to stop the selection circuit (double arrows in FIG. 2), signals to prevent the buffer 4 from being written (clock periods without double arrows and without bits covered by circles, FIG. 2) as well as signals to prevent the buffer 4 and simultaneously a memory location of the memory circuit 2 (clock periods without a double arrow, but with an encircled bit in FIG. 2) from being written and overwritten respectively. Each signal produced by the control circuit corresponds to one of the states of the control circuit. If letters of the alphabet are assigned to these states at random but in a one-to-one correspondent manner, the states A to X are obtained. The states thus featured by letters are shown in FIG. 2 between the bytes of the bottom row U and the bytes of the top row V.

The control circuit computes its next state on the basis of the state it has adopted at that moment and the negative justification signal 9a in accordance with the Table represented in FIG. 3.

FIG. 3 shows in the first column all states A to X of the control circuit. The second column states the numbers of the clock periods shown in FIG. 2 in which the control circuit has adopted the states to the left of the numbers. Columns 3, 4 and 5 denote which state the control circuit is to adopt in the next clock period when in this (next) clock period the total number of stuff bits in the bottom and top bytes as shown in FIG. 2 is zero, one or two. Blocks in FIG. 3 carrying a dash correspond to states which cannot occur due to the above restriction about the occurrence of stuff bits.

Figure 4:
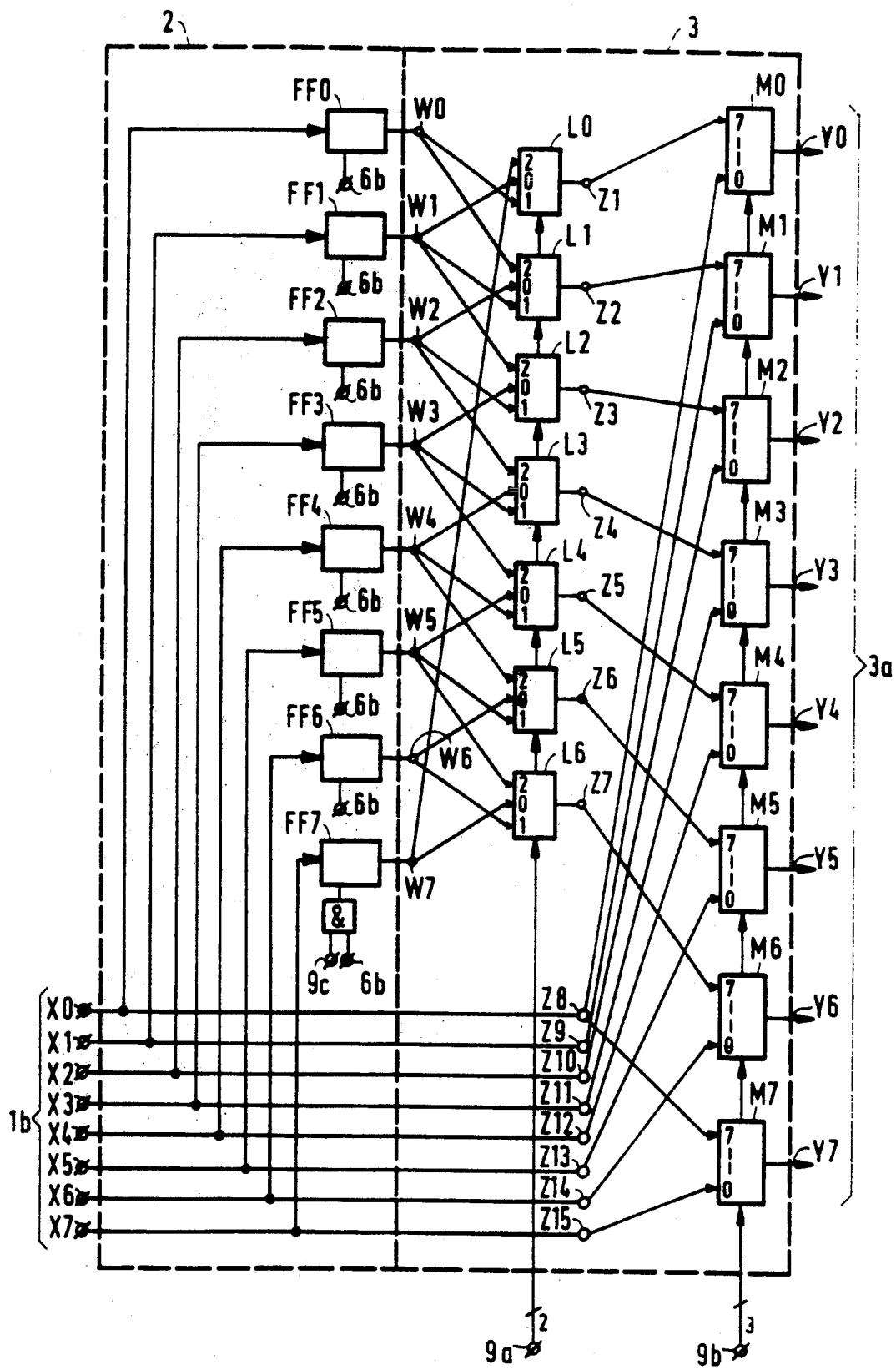
FIG. 4 shows a memory circuit according to the invention and a subsequent selection matrix according to the invention.

FIG. 4 shows the inner structure of the memory circuit 2 and selection circuit 3 according to the invention. Over the eight wires of the input line 1b the parallel bit streams X0 to X7 directly reach both the outputs Z8 to Z15 of the memory circuit 2 and each via a flip-flop FF0 to FF7 their outputs W0 to W7.

Each flip-flop comprises an inhibit input. If a binary 0 is available at such an input, the next clock edge of the byte clock signal 5b (the clock input is not shown) remains ineffective. If a stuff byte arrives, the signal 6b which is applied to the inhibit inputs changes to LOW (binary 0), so that this byte is not written in either the buffer 4 (the signal 6b also stops the write counter 6) or the flip-flops FF0 to FF7.

The AND combination of the signals 6b and 9c is available at the inhibit input of the flip-flop FF7. The flip-flop FF7 is also cut off when there is an overflow of the stuff bit counter 9. This procedure corresponds to the transition from the 39th to the 40th clock signal in FIG. 2.

Two cascades of addressable multiplexers are connected to the terminals W0 to W7 and Z8 to Z15. The first cascade comprises 3:1 multiplexers L0 to L6 and the second cascade 8:1 multiplexers M0 to M7. All the multiplexers of the first cascade are addressed in parallel by the negative justification signal 9a and all the multiplexers of the second cascade are addressed in parallel by the count 9b of the stuff bit counter 9. The eight bit streams Y0 to Y7 arranged by the multiplexer are transported to the buffer 4 over the line 3a.

The three inputs of the multiplexers L0 to L6 are identified by the numbers zero, one and two. If one of these numbers in encoded version occurs at the address input of one of these multiplexers, the appropriate input is connected to the output of the multiplexer. The number of an input switched through to the output simultaneously denotes the number of stuff bits in the actual byte clock period.

For identifying unambiguously the connections between the inputs of the multiplexers L0 to L6 and the terminals W0 to W7, for example, the shortening (L0: W1, W0, W7) is to be used. It has the following connotation: The input having the number 0 of the multiplexer L0 is connected to the terminal W1, the input having the number 1 to the terminal W0 and the input having the number 2 to the terminal W7. The following arrangement applies to the multiplexers L0 to L6:

(L0: W1, W0, W7); (L1: W2, W1, W0);
(L2: W3, W2, W1); (L3: W4, W3, W2);
(L4: W5, W4, W3); (L5: W6, W5, W4);
(L6: W7, W6, W5).

The multiplexers M0 to M7 are connected to the terminals Z1 to Z15. If their inputs are accordingly numbered 0 to 7, the connections can accordingly be represented as follows:

(M0: Z1, to Z8); (M1: Z2 to Z9);
(M2: Z3 to Z10); (M3: Z4 to Z11);
(M4: Z5 to Z12); (M5: Z6 to Z13);
(M6: Z7 to Z14); (M7: Z8 to Z15).

In addition the consecutive numbering of the inputs of the multiplexers M0 to M7 denotes that an input having the number k (k=0, ..., 7) is connected to the output of the multiplexer only when the address applied (count of the stuff bit counter 6) is also k.

We claim:

1. Circuit arrangement for removing stuff bits from a frame-structured signal, which is available as sequences of n bits supplied in parallel, comprising
   a) a memory circuit (2) for storing the n bits supplied in parallel,
   b) a controllable selection circuit (3) having n outputs and coupled to the output of the memory circuit (2), and
   c) a control circuit (9) having a control signal for determining a switching state of the selection circuit (3), the switching state determining which of the bits stored in the memory circuit (2) are applied to the n outputs of the selection circuit, characterized in that
   d) the memory circuit comprises n delay elements for delaying each of the n bits supplied in parallel for a duration of one bit,
   e) at predetermined intervals, the control circuit blocks acceptance of new bits in up to p−1 delay elements out of the n delay elements, where p represents a maximum number of stuff bits that can occur simultaneously among the n bits supplied in parallel, and $p \leq n$.

2. Circuit arrangement as claimed in claim 1, characterized in that the following features are implemented:
   f) the selection circuit (3) comprises cascades of addressable multiplexers,
   g) the control circuit comprises a modulo-n counting stuff bit counter (9) whose count can be adjusted by means of a negative justification signal (9a),
   h) the count (9b of the stuff bit counter (9) as well as the negative justification signal (9b) form addresses for the multiplexers, and
   i) the address inputs of the multiplexers of a cascade are arranged in parallel.

* * * * *